United States Patent Office 3,509,322
Patented Apr. 28, 1970

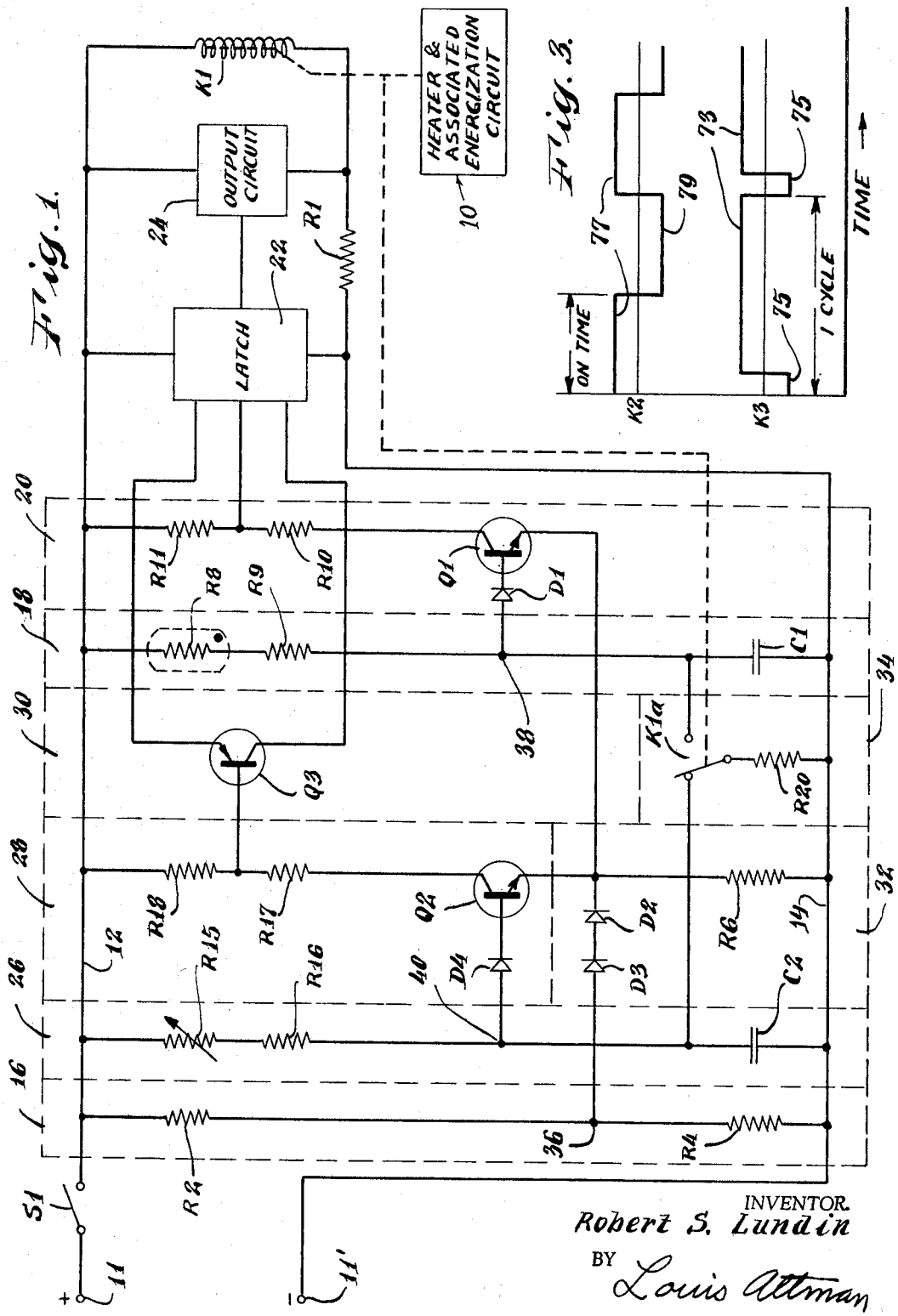

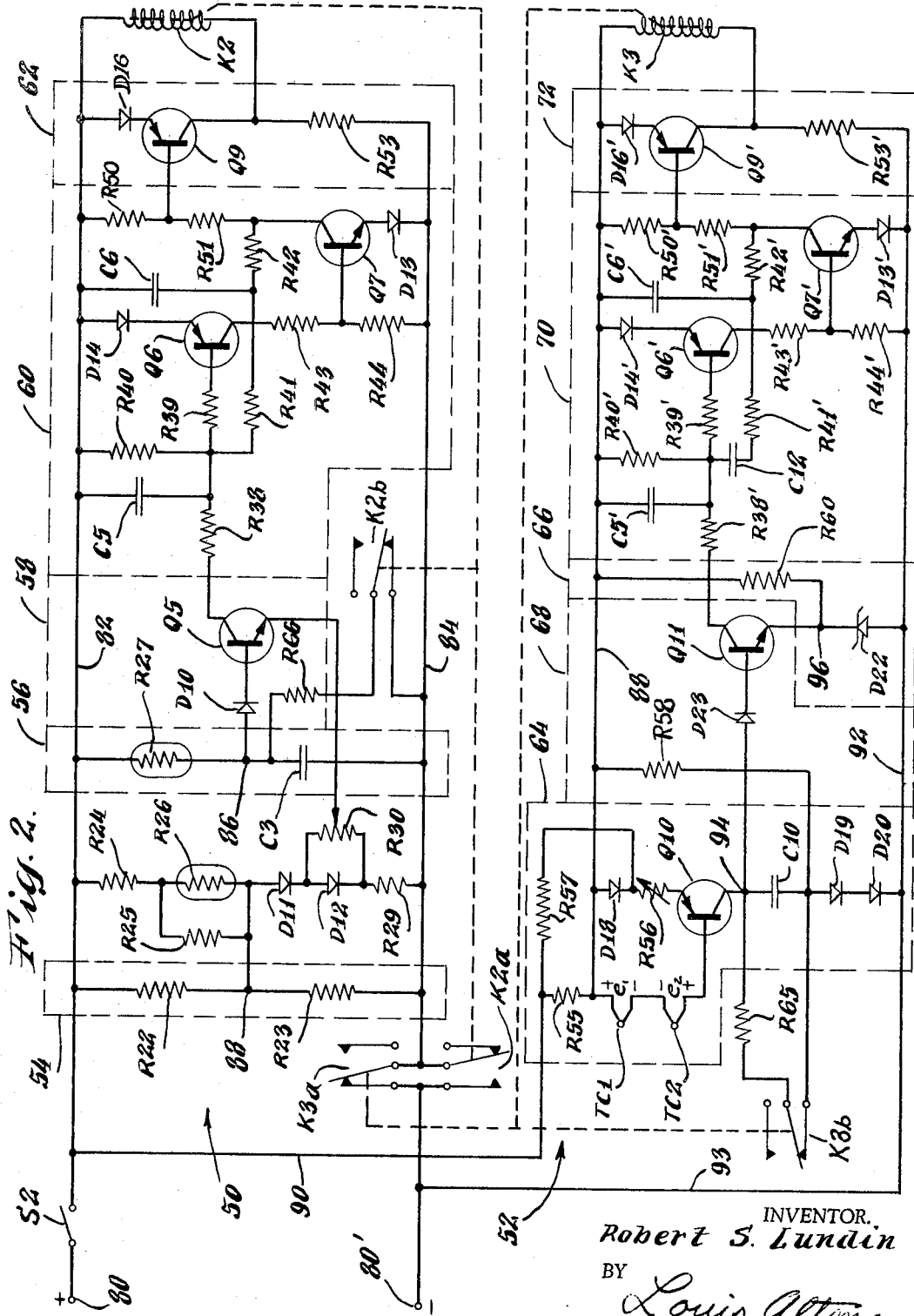

3,509,322
CONDITION RESPONSIVE INPUT CONTROLLERS
Robert S. Lundin, Thomaston, Conn., assignor to General Time Corporation, New York, N.Y., a corporation of Delaware
Filed July 19, 1965, Ser. No. 472,844
Int. Cl. H05b *1/02*
U.S. Cl. 219—494          10 Claims

ABSTRACT OF THE DISCLOSURE

A time proportioning control, where the "on" time is controlled according to an existing temperature condition and the "off" time is controlled according to a desired condition. Where the dissipation rate is variable, the "off" interval or overall cycle time is controlled according to the dissipation rate.

---

This invention relates to condition responsive input controllers. More particularly, it relates to a condition responsive, electronic on-off cycle timer adapted to control the power supplied to condition producing means so as to establish and maintain an adjustably predetermined condition level. Specifically, the input controllers of the invention are "proportional" controllers because the amount of power supplied is inversely proportional to the deviation of the controlled condition from the desired level or "set point."

A wide variety of condition responsive controllers have been devised for controlling or regulating conditions such as temperature, pressure, light, etc. To better pose the drawbacks and disadvantages of many prior controllers, consider the specific application of temperature control. Consider, for example, the situation where a room is heated by means of an electric heater. The temperature inside the room will depend on the temperature of the environment outside of the room, the thermal losses from the room, and the amount of electrical energy dissipated by the heater in the form of heat to the room. If the temperature in the room is less than the desired temperature, the heater must be energized in order to raise the temperature in the room. If the heater is operated at full capacity in order to rapidly bring the room temperature to the desired temperature, the room temperature will go above or "overshoot" the desired room temperature. The heater is then de-energized to permit the room temperature to fall to the desired or "set point" temperature. As is typically the case, the room temperature falls below the set point before the heater is again energized. The net result is that the room temperature oscillates or hunts about the set point.

If the heater is operated at substantially less than full capacity when the room temperature is substantially below the desired "set" temperature, the elevation of the room temperature to the set point temperature requires considerable time. Although the amount of temperature "overshoot" may be materially reduced, the long period of time required to bring the room temperature up to the desired temperature level is objectionable.

The above noted problems of temperature "overshoot" and slow recovery time are characteristic of many prior temperature controllers.

The obvious solution is of course to provide a temperature controller which operates in a manner to energize the heater at substantially full capacity when the room temperature is substantially below the desired temperature level. Then, as the room temperature approaches the set point, the energization of the heater is reduced. Prior "proportional" temperature controllers having this capability typically have been mechanical in nature, and thus are expensive, bulky, and require considerable preventive maintenance.

The ultimate in temperature control would be to control the heater such that it would supply to the room precisely the same amount of heat which is lost through the room walls, windows, and doors to the outside. However in many applications, this heat loss is not a constant factor.

Quite obviously, varying temperature differentials between the inside and outside of the room produce correspondingly varying quantities of heat loss. Unless means are included in the room temperature controller to take into consideration the changing environmental temperatures outside of the room, the calibrated temperature set point to which the controller has been set will drift. Consequently the controller, in effect operates to hold the room temperature at a level which is different from the set point. Typically, existing temperature controllers ignore outside temperatures. It will be appreciated that the above considerations also apply to the regulation of other conditions. While the present invention will be described in its specific application to temperature regulation, the invention, being generally applicable to many other control situations, is not so limited.

Accordingly, it is an object of the present invention to provide a condition responsive input controller.

A further object is to provide a controller of the above character adapted to regulate a wide variety of conditions.

An additional object is to provide a controller of the above character for controlling condition producing means so as to establish and maintain a desired condition level.

Another object is to provide a "proportional" controller of the above character.

A still further object of the invention is to provide a controller of the above character for timing the on and off intervals of successive operating cycles of condition producing means so as to automatically regulate the level of the condition at a desired condition level.

It is an additional object of the present invention to provide a controller of the above character wherein the desired condition level is solely determined by adjustably preset means establishing a predetermined and unvarying set point.

Another object is to provide a controller of the above character wherein the condition to be regulated is temperature.

Still another object is to provide an electronic controller of the above character that provides precise control and is fully compensated against extraneous effects; is rugged, substantially maintenance free, and inexpensive to manufacture.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings in which:

FIGURE 1 is a schematic circuit diagram, partially in block form, of one embodiment of a condition responsive input controller constructed according to my invention and adapted to temperature regulation;

FIGURE 2 is a schematic circuit diagram of an alternative embodiment of my invention; and FIGURE 3 is a timing diagram illustrating the operation of the input controller of FIGURE 2.

GENERAL DESCRIPTION

Broadly stated, the present invention provides an input controller for timing the on-off intervals of successive operating cycles of means producing a condition. In one disclosed embodiment of my invention, the controller comprises first and second interval timing sections which, in combination, define the time period of the operating cycle of the condition producing means. The first interval timing section comprises a timing capacitance charged from a source of fixed potential. A variable resistance connected in the charge path for this capacitance determines its charging rate. Similarly, the second interval timing section comprises a timing capacitance charged from the same source of fixed potential. A second variable resistance connected in the charging path for this timing capacitance source determines its charging rate. The on interval of each operating cycle is timed by one timing section. The off interval is timed by the other timing section.

The variable resistance in one interval timing section is adjusted to establish a set point that determines a desired condition level. The variable resistance in the other interval timing section is condition responsive and physically located so that it responds to the existing level of the condition produced by the aforesaid means. This response is manifested by a variation in resistance proportional to the variation in the existing condition level from the set point.

Each interval timing section further comprises a detector. Each detector provides an output signal signalling the expiration of the timing interval when its associated timing capacitance is charged to a predetermined fraction of the voltage of the potential source. The output from one of the detectors triggers a latch circuit to a first state where it remains until the output of the other detector triggers the latch to a second state.

While in its first state, the latch causes output means to energize the condition producing means. While the latch is in its second state, the output means de-energizes the condition producing means. The two interval timing sections operate alternatively during each operating cycle. The adjusted variable resistance and the condition responsive resistance in their respective interval timing sections automatically control the on-off time intervals of each operating cycle for the condition producing means. This timing control establishes and maintains the existing condition level at the set point level determined by adjustment of the adjustable resistance.

In an alternative embodiment of my invention, one interval timing section is constructed so as to define the overall time period of each operating cycle. The other timing section then operates to control the "on" time of each cycle. The on time interval is made variable by the incorporation of a condition responsive resistance which responds to the existing level of the condition. The time period of the operating cycle of the condition producing means is established at a calibrated set point corresponding to the desired level for the condition. The net operating effect of the timer is thus to regulate the level of the condition at the desired condition level.

This second embodiment of my invention is further implemented so as to automatically respond to a second varying condition which has a known effect on the condition to be regulated. In the situation wherein the temperature within an enclosure is to be regulated, the first condition is the inside temperature while the second condition may be the temperature of the environment surrounding the enclosure. The timer operates in response not only to the temperature within the enclosure, but also in response to the temperature differential between the enclosure environment and the outside environment to regulate the inside temperature.

Referring now to FIGURE 1, the basic construction of the input controller of the invention is in accordance with the principles disclosed in the copending application of Klaus Wallentowitz, Ser. No. 405,503, filed Oct. 21, 1964 for Electronic Timer Circuit. My invention, however, is directed to a condition responsive on-off input controller operating to establish and maintain a predetermined condition level. The specifically disclosed application of my invention is to the control of a temperature condition, however its general application is not so limited.

To this specific end, an output relay K1 has associated relay contacts (not shown) operating in a heater energizing circuit, generally indicated at 10, so as to control the application of electrical power to a heater. The electrical heater may be of the type employed in heating an oven, a room, building, etc., to a desired temperature and thereafter maintaining the temperature at the desired level.

A source of potential is connected across power input terminals 11, 11', with terminal 11 positive relative to terminal 11'. Upon closure of a manually operated on-off switch S1, an energizing circuit for the relay K1 is completed from a positive buss 12 through the relay operating coil and a current limiting resistor R1 to the negative buss 14. As a result, the relay K1 operates to effect closure of associated relay contacts connected in the energization circuit 10 for the heater. The heater is energized to radiate heat to the particular enclosure in which the temperature is to be regulated.

Immediately upon closure of the on-off switch S1 and the resulting energization of the relay K1, a bridge circuit, constituted by the sides 16 and 18, cooperates with a detector circuit 20, a latch circuit 22 and an output circuit 24 to effect de-energization of the output relay K1 after a predetermined time interval. The preferred form of latch circuit 22 and output circuit 24 is specifically disclosed in the above noted Wallentowitz application and also in FIGURE 2 of this application.

Once relay K1 is de-energized, a second bridge circuit comprising side 16 and another side 26 cooperates with a second detector circuit 28, a driver circuit 30, latch circuit 22 and an output circuit 24 to re-energize the output relay K1 upon the expiration of a second interval of time. During this second interval of time when the output relay K1 was de-energized, its associated relay contacts dropped out to break the energization circuit 10 for the heater. Thus, the heater is disconnected from its power supply during this second or "off" time interval and connected thereto during the first or "on" time interval. From energization to de-energization and back to energization of the output relay K1 constitutes a complete operating cycle in terms of relay operation as well as in terms of heater operation. This operating cycle is repeated as long as the on-off switch S1 remains closed.

The above general operation of the timing cycle is the same as that described in the above noted Wallentowitz application except as to its specific application to the control of an electrical heater. As also described in the above noted copending application, the on-off cycle timer of FIGURE 1 includes a compensating network 32 for cancelling out the junction potentials in the detector circuits, and a capacitor discharging circuit 34 controlled by the output relay K1. Furthermore, the use of the bridge circuit arrangements render the cycle timer insensitive to power supply variations.

Still referring to FIGURE 1, the bridge side 16 comprises a potential divider consisting of series resistors R2 and R4 connected across power busses 12 and 14. A junction 36 between resistors R2 and R4 constitutes one output terminal of the bridge at which is developed a predetermined fraction of the voltage across power busses 12, 14.

The bridge side 18 comprises an RC timing network consisting of a condition responsive resistance element R8, a resistor R9, and a capacitor C1 connected in series between the positive buss 12 and the negative buss 14. Since the condition to be regulated in the disclosed application is temperature, the resistive element R8 is a temperature responsive element whose resistance value varies in proportion to temperature. One suitable form of tempreature responsive resistance element is a thermistor which has a negative temperature coefficient. Thus, its resistance value varies in inverse proportion to the temperature to which it is subjected. The termistor R8 is situated in the enclosure with the electrical heater 10 so as to respond to the temperature therein.

A junction 38 between resistor R9 and capacitor C1 is connected through a diode D1 to the base of a transistor Q1 included in the detector circuit 20. The emitter of transistor Q1 is connected back through diodes D2 and D3 in the compensating network 32 to the junction 36 of bridge side 16. The cathode of diode D2 is connected to buss 14 through resistor R6. The collector of transistor Q1 is connected through resistors R10 and R11 to the positive buss 12.

Upon initial closure of the switch S1 with the resulting energization of the output relay K1, capacitor C1 in bridge side 18 begins charging toward the potential across the busses 12, 14 through the thermistor R8 and resistor R9. While the output relay K1 is so energized, its associated relay contact K1a operating in the capacitor discharging circuit 34 is in the position shown in FIGURE 1 to permit the capacitor C1 to charge toward the full voltage across the busses. As the capacitor C1 charges, the potential at junction 38 rises positively at a rate determined by the resistance of thermistor R8 and resistor R9. When the potential at junction 38 rises to a voltage equal to the potential at junction 36 in bridge side 16, the transistor Q1 is biased on.

As more fully explained in the above-noted copending application, when transistor Q1 goes into conduction, a signal is developed at the junction between resistors R10 and R11 which is effective to turn on the latch 22. With the latch 22 triggered to its on state, the output circuit 24 is conditioned to complete a circuit shunting the operating coil of output relay K1. As a consequence, output relay K1 is de-energized, which, in turn, effects the de-energization of the heater 10.

It is thus seen that the time interval required for the capacitor C1 to charge sufficiently to effect the triggering on of the latch 22 defines the time interval in each operating cycle during which the relay K1 is energized, and correspondingly, the time interval during which the heater is energized. It will further be seen that the higher the temperature in the enclosure the lower the resistance value of the thermistor R8 in responding to this temperature. Consequently, the capacitor C1 charges more rapidly, and the interval of time during which the heater 10 is energized is decreased.

At the conclusion of this "on" interval in the operating cycle signified by the de-energization of the output relay K1, its relay contact K1a moves to the right as seen in FIGURE 1 to discharge the capacitor C1. At this point, the second bridge consisting of bridge sides 16 and 26 goes into operation to time the "off" interval of the operating cycle. The bridge side 26 comprises variable resistor R15, a fixed resistor R16, and a capacitor C2 connected in series between the positive and negative busses 12, 14. Junction 40 between resistor R16 and capacitor C2 is connected through diode D4 to the base of a transistor Q2 included in the detector circuit 28. The emitter of transistor Q2 is connected back through diodes D2 and D3 in the compensating network 32 to junction 36 in the bridge side 16. The collector of transistor Q2 is connected through resistors R17 and R18 to the positive buss 12.

With the output relay K1 now de-energized, its associated relay contact K1a is switched to the right as seen in FIGURE 1 to effectively discharge capacitor C1 in bridge side 18 to substantial zero volts through a small current limiting resistor R20. This enables capacitor C2 in bridge side 26 to begin charging toward the potential across the power busses. The rate at which capacitor C2 charges, and thus the rate at which the potential at junction 40 rises positively is determined by adjustment of the resistance of variable resistor R15. The resistance value of resistor R15 is adjusted to a value calibrated according to a desired temperature level which is to be maintained in the enclosure in which the heater 10 and the thermistor R8 operate. Once the potential at terminal 40 rises to equal the potential at junction 36 in bridge side 16, transistor Q2 is biased on to develop a signal at the junction between resistors R18 and R17 effective to turn on a transistor Q3 included in the driver circuit 30. With the conductance of transistor Q3, the latching circuit in the latch 22 is shunted so as to turn off the latch. This operation is specifically described in the above-noted Wallentowitz application. With the latch now triggered to its off state, the output circuit 24 previously shunting the operating coil of the output relay K1 is disabled. Consequently, output relay K1 is re-energized to complete the operating cycle. Succeeding operating cycles are timed in identical fashion.

The temperature controllability of the on-off cycle timer disclosed in FIGURE 1 can perhaps best be demonstrated mathematically as follows. The duration of the "on" and "off" time intervals can be expressed as:

$$t_{on} = R_8 C_1 \ln\left[1 - \frac{R_4}{R_2 + R_4}\right]$$

$$t_{off} = R_{15} C_2 \ln\left[1 - \frac{R_4}{R_2 + R_4}\right]$$

where $t_{on}$ = relay K1 energization (seconds);
$t_{off}$ = relay K1 de-energization (seconds);
$R_8$ = resistance of thermistor R8;
$C_1$ = capacitance of capacitor C1;
$R_{15}$ = resistance of resistor R15 (set point);
$C_2$ = capacitance of capacitor C2; and, $\frac{R_4}{R_{21} + R_4}$ = voltage division of bridge side 16

Fixed resistors R16 and R17 are omitted from the equations for the sake of simplicity. It will be seen that their inclusion in the circuit for the purpose of establishing lower time limits of the on and off time intervals does not affect the mathematical expressions of the circuit operation. The percentage of the on time interval in each operating cycle can be expressed as $$\%_{on} = \frac{t_{on}}{t_{on} \times t_{off}} = \frac{R_8}{R_{15} + R_8}$$

where $C_1 = C_2$.

The resistance of thermistor R8 varies with temperature as follows:

$R_8 = R_{8_0}(1 + \alpha T)$;
where $R_{8_0}$ = resistance of thermistor at 0° C.;
$\alpha$ = temperature coefficient of thermistor; and,
T = temperature (° C.) within enclosure.

therefore $$\%_{on} = \frac{R_{8_0}(1+\alpha T)}{R_{8_0}(1+\alpha T) + R_{15}}$$

$$= \frac{1}{1 + \frac{R_{15}}{R_{8_0}(1+\alpha T)}}$$

The average power P dissipated by the heater 10 can be expressed as:

$P = \%_{on} E_h I_h;$ where $E_h$=voltage applied to heater;
$I_h$=current drawn by heater.

therefore $$P = \frac{E_h I_h}{1 + \frac{R_{15}}{R_{8_0(1+\alpha T)}}}$$

Solving for temperature:

$$T = \frac{1}{\alpha}\left[\frac{R_{15}}{R_{8_0} = \left[\frac{E_h I_h}{P} - 1\right]} - 1\right]$$

It will be observed that the $E_h I_h$ expresses the maximum capacity of the heater if it were energized continuously while P is the average electrical power supplied to the heater. At steady state, the average power P required to maintain the temperature set for would ideally equal the heat losses from the enclosure. In situations where the heat losses are constant, the ratio $E_h I_h/P$ becomes a constant of the heating system. Thus, all of the factors of the temperature equation above are constants, and the temperature T is entirely determined by the setting of variable resistor R15. It will be observed that the maximum temperature obtainable is $1/\alpha$ ° C.

The precise temperature control achieved by the timer of FIGURE 1, as seen in the temperature expression above, presumes that the heat losses from the heated enclosure are constant. While this presumption is valid from a practical consideration where the enclosure is, for example, an oven, it would not be valid for a house. In home heating, the heat losses through the walls, doors, windows, etc., will vary considerably depending upon the outside temperature. Consequently, the expression $E_h I_h/P$ would not be a constant, and the inside temperature cannot be determined solely by the setting of the resistor R15. The result is that a particular set point is only valid for a particular outside temperature, and variations in the outside temperature cause the set point to drift. The cycle timer of FIGURE 2 overcomes this limitation.

The on-off cycle timer shown in FIGURE 2 comprises a section, generally indicated at 50, operating to time the "on" interval of each operating cycle; and a section, generally indicated at 52, operating to time the overall period of each operating cycle. It will be recalled that in the timer of FIGURE 1, the two timing sections time the "on" interval and the "off" interval which added together equal the overall period of an operating cycle. Using a somewhat different philosophy, section 52 times the period of the operating cycle while section 50 times the "on" interval of each cycle. Thus, the "off" interval of a cycle is determined by subtracting the "on" interval from the cycle period.

First considering section 50, bridge sides 54 and 56 cooperate with a detector 58, a latch circuit 60, and an output circuit 62 in timing the interval in each cycle during which an output relay K2 is energized. This output relay K2 includes operatively associated contacts (not shown) connected in the energization circuit of a heater in the manner described in FIGURE 1.

Section 52 includes bridge sides 64 and 66 operating in conjunction with a detector 68, a trigger circuit 70, and an output circuit 72 in order to momentarily de-energize an output relay K3 at timed intervals defining the period of an operating cycle. The output relay K3 of section 52 has relay contacts K3a operating in section 50 which are effective upon momentary de-energization of the relay K3 to initiate operation of section 50 to time an "on" time interval.

As seen in FIGURE 3, relay K3 of section 52 is energized for the time interval 73 and momentarily de-energized for the time interval 75 in each cycle time. When relay K3 is momentarily de-energized for this time interval 75, its associated contacts K3a (FIGURE 2) momentarily close to initiate operation of section 50 to time the on time interval of each cycle time. It is understood that during this on time, output relay K2 of section 50 is energized, as indicated at 77, to complete the energization circuit for the heater (not shown). At the end of the on time interval, section 50 operates to de-energize its output relay K2 for the remainder of the cycle time, as indicated at 79. During this off time interval of each cycle time, the energization circuit for the heater is interrupted by the contacts (not shown) of output relay K2.

Referring more specifically to the circuitry of FIGURE 2, a suitable source of potential is applied across input terminals 80 and 80', with terminal 80 maintained positive relative to terminal 80'. Terminal 80 is connected through an on-off switch S2 to a positive buss 82 in section 50. Negative terminal 80' is connected either by relay contacts K3a of output relay K3 in section 52 or by relay contacts K2a of output relay K2 in section 50 to a buss 84. Bridge side 54 of section 50 includes a potential divider consisting of resistors R22 and R23 connected in series across the busses 82, 84. Resistor R24 and the parallel combination of resistor R25 and thermistor R26 connected across resistor R22 provide temperature compensation for the bridge circuit in the manner described in detail in the copending Wallentowitz application.

Bridge side 56 of section 50 is comprised of a thermistor R27 connected in series with a timing capacitor C3 across the busses 82, 84. A junction 86 between the thermistor R27 and the timing capacitor C3 is connected through a diode D10 to the base of a transistor Q5. A junction 88 between resistors R22 and R23 in bridge side 54 is connected through a pair of diodes D11 and D12 and a resistor R29 to the negative buss 84. A potentiometer R30 is connected across diode D12 from which a potential is tapped for application to the emitter of transistor Q5. As more fully explained in the Wallentowitz application, diodes D11, D12, and resistor R30 serve to cancel out the junction potentials of diode D10 and transistor Q5 in the detector circuit 58 during bridge circuit operation.

In the same manner as described for the circuit of FIGURE 1, the thermistor R27 is disposed in the environment which is to be temperature regulated. Consequently, the capacitor C3 in bridge side 56 charges at a rate determined by the resistance value of thermistor R27 which is inversely proportional to the existing temperature within the enclosure. Once the potential at junction 86 rises to a level substantially equal to the voltage at junction 88, transistor Q5 is biased into conduction with the result that the latch 60 is turned on.

The latch 60, constructed in the manner described in the Wallentowitz application includes a pair of transistors Q6 and Q7. Once transistor Q5 goes into conduction, the base of transistor Q6 in the latch circuit 60 is driven negatively by the circuitry of resistors R38, R39 and R40 so as to bias this transistor on. With transistor Q6 in conduction, the base of transistor Q7 rises positively so as to bias this transistor on. Once transistor Q7 goes into conduction, a latching circuit consisting of resistors R40, R41 and R42, the collector-emitter circuit of transistor Q7, and diode D13 serves to latch transistor Q6 into conduction. Transistor Q6 in turn holds transistor Q7 in conduction through the latching circuit comprised of diode D14, its own emitter-collector circuit, and resistors R43 and R44. Capacitors C5, C6 and resistor R41 constitute a low pass filter for the prevention of spurious triggering of the latch 60.

The output circuit 62 is constructed in the same manner described in detail in the above noted Wallentowitz application and as generally described in connection with FIGURE 1, herein. Accordingly, a transistor Q9 provides a series circuit including its own emitter and collector, and a diode D16 connected across the operating coil of the output relay K2. The base of transistor Q9 is connected to the junction between resistors R50 and R51. When the latch 60 is in its off state, transistor Q7 is nonconducting with the result that transistor Q9 in the output circuit 52 is held cut off. Consequently, energizing current flows from the positive buss 82 through the operating coil of the output relay K2 and the current limiting resistor R53 to the negative buss 84. However, when the latch 60 is triggered to its on state by the detector 58, transistor Q7 goes into conduction causing the potential at the base of transistor Q9 to fall negatively. Transistor Q9 goes into conduction completing the shunting circuit for the relay operating coil, whereupon the output relay K2 is de-energized. In the specific application of the latch 60 in section 50, the latch reverts to its off state (transistors Q6 and Q7 nonconducting) when this section is disconnected from the potential source across input terminals 80, 80'.

Considering now the section 52, a positive buss 88 is connected by a resistor R55 and a lead 90 to the positive buss 82 in section 50. A negative buss 92 for section 52 is connected directly to input terminal 80' by a lead 93. Bridge side 64 of section 52 is comprised of a series circuit connected between busses 88 and 92 consisting of a diode D18, resistor R56, the emitter-collector circuit of a transistor Q10, a timing capacitor C10, diode D19, and diode D20. The junction between diode D18 and variable resistor R56 is connected through a resistor R57 to the junction between lead 90 and resistor R55. The purpose of this circuitry is to maintain the diode D18 forward biased. Similarly, the junction between timing capacitors C10 and diode D19 is connected to the positive buss 88 through a resistor R58 for the purpose of maintaining diodes D19 and D20 forward biased.

A pair of thermocouples TC1 and TC2 developing opposing potentials $e_1$ and $e_2$, respectively, are connected between the positive buss 88 and the base of transistor Q10. Thermocouple TC1 is positioned to respond to the temperature within the enclosure to be temperature regulated while the thermocouple TC2 is situated outside of the enclosure to respond to the temperature of the surrounding environment. Consequently, thermocouples TC1 and TC2 develop opposing potentials $e_1$ and $e_2$ for controlling the conductance of the emitter-collector circuit of transistor Q10 through which the charging current for capacitor C10 flows. The potential differential between potentials $e_1$ and $e_2$ is proportional to the inside-outside temperature differential.

The other bridge side 66 of section 52 is comprised of a resistor R60 connected in series with a Zener diode D22 across the busses 88, 92. A junction 94 between transistor Q10 and timing capacitor C10 in bridge side 64 together with a junction 96 between the resistor R60 and diode D22 in bridge side 66 constitute the two output terminals of the bridge. Junction 94 is connected through a diode D23 to the base of a transistor Q11 in the detector circuit 68 while the emitter of the same transistor is connected to junction 96. It will be seen from the bridge equation set out below that the forward potential drops across diodes D19 and D20 effectively cancel out the junction potential of diode D23 and the base-emitter junction potential of transistor Q11 in the detector circuit 68.

The collector of transistor Q11 is connected to the trigger circuit 70 which is constructed in the manner of the latch circuit 60 of section 50 except for the inclusion of a capacitor C12. The parts of the trigger circuit 70 for which there are corresponding parts in the latch circuit 60 are given the same reference numeral, but distinguished by a prime ('). The capacitor C12, not included in the latch circuit 60, is connected in the latching circuit for transistor Q6' between the junction of resistors R39' and R40', and resistor R41'. As a result, the circuit 70 is converted from a bistable latch circuit to a monostable trigger circuit. This will be seen from the fact that once transistor Q11 in the detector circuit 68 is turned on, thus turning on transistors Q6', and Q7', in the trigger circuit 70, the capacitor C12 will begin charging toward the positive potential on bus 88. After a predetermined time interval, the base of transistor Q6', will return to a sufficiently positive potential to cut off this transistor. This will result in transistor Q7' being turned off, thus returning the trigger circuit to its one stable state.

The trigger circuit 70 controls the output circuit 72 which is constructed in the same manner as the output circuit 62 in section 50. Thus, when the trigger 70 is triggered on by conduction of the transistor Q11 in the detector circuit 68, transistor Q9', in the output circuit 72 (corresponding to transistor Q9 in the output circuit 62 of section 50) is turned on for the period that the trigger circuit 70 is in its "on" or unstable state. The operating coil for the output relay K3 is thus shunted, resulting in its de-energization. Shortly thereafter, the trigger circuit 70 returns to its normal "off" or stable state with the result that transistor Q9' is turned off and the operating coil for output relay K3 is again energized.

In considering the combined operation of sections 50 and 52, upon closure of switch S2, the output relay K3 of section 52 is energized since busses 88, 92 are then connected to input terminals 80, 80'. The contacts K3a operatively associated with output relay K3 move to the right as seen in FIGURE 2 with the result that the negative bus 84 is disconnected from the negative input terminal 80'. Output relay K2 of section 50 is thus disconnected from the power source at terminals 80, 80' and its operatively associated contacts K2a are in the condition shown in FIGURE 2. There is the possibility that the relay contacts K3a do not drop out before output relay K2 of section 50 operates to close its contacts K3a and complete a self-holding circuit. This uncertainty exists only for the first operating cycle after closure of the switch S2. In the present description, it is assumed that for the initial operating cycle output relay K2 is not energized.

Capacitor C10 of section 52 begins charging at a rate determined by the degree of conductance of transistor Q10 and the setting of resistor R56. The setting of resistor R56, as will be seen, establishes the set point, i.e., the desired temperature to be established and maintained within the enclosure. The conductance of transistor Q10 is determined by the opposing potentials $e_1$ and $e_2$ developed by thermocouples TC1 and TC2, respectively. As previously noted, the thermocouple TC1 responds to the temperature within the enclosure while thermocouple TC2 responds to the temperature outside the enclosure. Consequently, the rate at which capacitor C10 is charged is determined by the set point, and both the inside and outside temperatures.

Once capacitor C10 charges to the point where the potential at junction 94 substantially equals the potential at junction 96 fixed by Zener diode D22, the transistor Q11 in the detector circuit 68 is turned on to trigger the trigger circuit 70 to its unstable state. The output circuit operates during this period that the trigger circuit 70 is in its unstable state to short out the operating coil for output relay K3. The relay contacts K3a of output relay K3 drop out to connect the input terminal 80' to the negative bus 84 of section 50. The output relay K2 for section 50 is thus energized to pull in its operatively associated contacts K2a so as to maintain the connection between the input terminal 80' and the negative buss 84 of section 50. Once this self-holding circuit is established, the output relay K3 of section 52 may be reenergized and its associated contacts K3a operated to the right as seen in FIGURE 2 without interrupting the energization circuit for the output relay K2 of section 50.

The duration that the trigger circuit 70 remains in its unstable state need only be so long as to permit the output relay K2 of section 50 to be sufficiently energized through relay contacts K3a to establish the self-holding circuit through its relay contacts K2a; and to substantially discharge capacitor C10 through relay contacts K3b and resistor R65. After the trigger circuit 70 returns to its one stable state and relay K3 is again energized, relay contacts K3b open to permit timing capacitor C10 to again charge up. At the same time, timing capacitor C3 in section 50 is charging toward the voltage across busses 82, 84. The time interval (cycle period) timed by the section 52 is necessarily always larger than the time interval ("on" interval) timed by section 50.

Once capacitor C3 has charged to a potential sufficient to energize the voltage detector 58 and trigger the latch 60 to its on state causing the de-energization of relay K2, its relay contacts K2a drop out to disconnect the bus 84 from the negative input terminal 80'; whereupon the latch reverts to its off state. At the same time, contacts K2b operatively associated with output relay K2 close to discharge capacitor C3 through a current limiting resistor R66. It will be seen that output relay K2 is not re-energized to recharge capacitor C3 until section 52 has operated to begin a new operating cycle precipitated by the momentary de-energization of output relay K3. The coordinated operation of sections 50 and 52 of the on-off cycle timer of FIGURE 2 is shown in FIGURE 3.

Since the thermistor R27 in section 50 is responding to the temperature within the enclosure; capacitor C3 is charging at a rate inversely proportional to the temperature. Thus, if the temperature in the enclosure is low, the resistance of thermistor R27 is high and the charging rate will be relatively slow. As a result, output relay K2 is energized for a longer period of time so as to cause the heater to be energized for longer time intervals during each operating cycle. On the other hand, section 52, as previously noted, is timing the time period of an operating cycle. The period of the operating cycle is established by the temperature differential between the inside and the outside of the enclosure and the set point established by adjustment of resistor R6. It will be seen that, the greater this temperature differential wherein the inside temperature is significantly greater than the outside temperature, the proportionally larger difference in the thermocouple potentials $e_2$ and $e_1$ causes transistor Q10 to be biased further into conduction thus increasing the charging current into capacitor C10. Thus, timing capacitor C10 is charged more rapidly and the time period of the operating cycle is decreased. This in effect reduces the off interval during each cycle during which the output relay K2 is de-energized and the heater is also de-energized. Consequently, the average power dissipated by the heater is increased so as to raise the temperature level within the enclosure.

The operation of the on-off cycle timer of FIGURE 2 can also be expressed mathematically as follows. Considering section 50, the "on" time during which output relay K2 is energized to, in turn, enable the energization of the heater (not shown) is expressed as:

$$t_{on}=C_3R_0(1+\alpha T_1)\ln\left[1-\frac{R_{23}}{R_{23}+R_{22}}\right]$$

where $R_0(1+\alpha T_1)$=resistance of thermistor R27 at $T_1°$ C. within enclosure.

The above expression has been simplified by omitting the temperature compensating elements R24, R25, and R26. In section 52, the charging current $I_c$ for capacitor C10 is constant when under conditions of equilibrium:

$$e_1-e_2+V_{Q10}-I_cR_{56}-V_{D18}=0$$

where $V_{Q10}$=base-emitter junction potential of transistor Q10; and,
$V_{D18}$=junction potential diode D18.

With the diode D18 selected as a fairly good copy of the base-emitter junction of transistor Q10, their junction potentials $V_{D18}$ and $V_{Q10}$ cancel each other in the quilibrium equation. With constant charging current $I_c$, the voltage $V_{C10}$ across capacitor C10 as a function of time $t$ can be expressed as:

$$V_{C10}=\frac{I_ct}{C_{10}}$$

Substituting for $I_c$, the following expression is obtained:

$$V_{C10}=\frac{t}{C_{10}}\left[\frac{e_1-e_2}{R_{56}}\right]$$

Since the diodes D19 and D20 are selected for their ability to cancel out the junction potentials of diode D23 and the base-emitter junction of transistor Q11, this transistor will conduct to signal the end of one cycle time when $V_{C10}=V_{D22}$ (the voltage across Zener diode D22). Consequently, the time period $t_c$ of a cycle may be expressed as:

$$t_c=\frac{V_{D22}R_{56}C_{10}}{e_1-e_2}$$

This expression of the cycle time $t_c$ neglects the short time when output relay K3 is de-energized. It will be observed that:

$$e_1-e_2=\epsilon(T_1-T_2)$$

where $\epsilon$=the thermocouple constant of thermocouples TC1 and TC2;
$T_1$=inside temperature (° C.); and,
$T_2$=outside temperature (° C.).

Therefore, the cycle time is equal to:

$$t_c=\frac{V_{D22}R_{56}C_{10}}{\epsilon(T_1-T_2)}$$

Considering the ratio of the average power P dissipated by the heater to the total heater capacity $E_hI_h$ as was done in the mathematical analysis of the cycle timer of FIGURE 1, it will be seen that, at equilibrium:

$$\frac{P}{E_hI_h}=\frac{t_{on}}{t_c}=\frac{C_3R_0(1+\alpha T)\ln\left[1-\frac{R_{23}}{R_{23}+R_{22}}\right]}{\frac{V_{D22}R_{56}C_{10}}{\epsilon(T_1-T_2)}}$$

Equilibrium occurs when the average power P dissipated by the heater just offsets the heat losses from the enclosure. Then, since the average P is directly proportional to the temperature differential $T_1-T_2$, it can be expressed mathematically as:

$$P=\rho(T_1-T_2)$$

where $\rho$=constant of proportionality dependent on the insulation characteristics of the enclosure.

Thus, the last two equations can be combined as:

$$\frac{\rho(T_1-T_2)}{E_hI_h}=\frac{C_3R_0(1+\alpha T_1)\ln\left[1-\frac{R_{23}}{R_{23}+R_{22}}\right]\epsilon(T_1-T_2)}{V_{D22}R_{56}C_{10}}$$

It will be observed that $(T_1-T_2)$ may be cancelled from both sides of the equation. Now, solving for $T_1$, the temperature within the enclosure:

$$T_1=\frac{1}{\alpha}(KR_{56}-1)$$

where $$K=\frac{E_hI_hC_3R_0\ln}{\rho V_{D22}C_{10}\left[1-\frac{R_{23}}{R_{23}+R_{22}}\right]}$$

Since all of the factors making up the constant K can themselves be considered as constants, the temperature $T_1$, within the enclosure, is determined solely by the adjustment of resistor R56 which provides the system set point. It will be seen that the temperature regulation achieved by the on-off cycle timer of FIGURE 2 is wholly independent of the power supply for the timer and the outside temperature.

It will thus be seen that I have provided a novel condition responsive input controller in the form of a proportional on-off cycle timer operating in response to the existing condition level and a set point adjustment to precisely control condition producing means. In the specific circuitry disclosed, a negative temperature coefficient thermistor is used in the timing of the "on" time interval. It will occur to those skilled in the art that a positive temperature coefficient circuit element could be incorporated in the "off" interval timing circuit of FIGURE 1 or the cycle timing circuit of FIGURE 2 to achieve the same result. It will be observed that the desired temperature control function may be achieved since the positive temperature coefficient circuit element would effectively and automatically operate to increase the "off" time or cycle time as the temperature level rises, and vice versa. The set point resistor could then operate in the "on" interval timing circuit to establish a fixed "on" time for a particular temperature set point.

As disclosed in FIGURE 2, two condition responsive elements in the form of thermocouples TC1 and TC2 are employed to derive a signal proportional to the temperature differential. It will be appreciated that in the disclosed application of my invention, the most practical way of electrically expressing energy dissipation, i.e. heat loss, is in terms of temperature differential. In other applications of my invention, it may be found that only a single condition responsive circuit element need be used in deriving a signal proportional to a varying ambient constraint on the controlled condition. It will occur to those skilled in the art that, among the wide variety of control applications to which my invention may be applied by suitable modification of the disclosed embodiment, the application to controlling a cooling system parallels the disclosed application to controlling a heating system.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings, should be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Having described my invention, what I claim as new and desire to secure by Letters Patent is:

1. An input controller for controlling the on-off cycling of condition producing means, comprising, in combination:
    (A) a source of electrical potential;
    (B) a first timing circuit connected to said potential source, and comprising
        (a) a capacitance charged from said potential source,
        (b) a variable resistance connected in the charging path for said capacitance to determine the charging rate thereof,
            (1) said variable resistor being adjustably preset according to a desired condition level, and
        (c) a detector operating when the potential across said capacitance reaches a reference level to determine the off time interval of each operating cycle;
    (C) a second interval timing circuit connected to said voltage source, and comprising
        (a) a capacitance charged from said voltage source,
        (b) a condition responsive resistance connected in the charging path for said capacitance to determine the charging rate thereof,
            (1) said resistance having a resistance value inversely proportional to the existing level of said condition, and
        (c) a detector operating when the potential across said capacitance reaches a reference level to determine the on time interval of each cycle; and,
    (D) output means controlled by said interval timing circuits to establish the on-off energization time intervals of each operating cycle for condition producing means,
        (a) whereby to establish and maintain the condition level at the desired level according to the adjustably preset resistance of said variable resistance.

2. The input controller defined in claim 1 further defined in that the condition producing means is a heater and said condition responsive resistance is a temperature responsive thermistor.

3. The input controller defined in claim 2 wherein said timing circuits share
    (a) a potential divider connected across said potential source and
        (1) operating to establish said reference potential level for application to the detectors in each said timing circuits.

4. The input controller defined in claim 3 wherein said output means comprises:
    (a) a bistable latch triggered from one stable state to another by the detectors in said timing circuits,
    (b) an output relay having
        (1) first contacts operating in the energization circuit for said heater, and
        (2) second contacts operating to alternately discharge the capacitances in said timing circuits, and
    (c) an output circuit conditioned according to the state of said latch to control the energization state of said relay.

5. An input controller for timing the on-off cycling of condition means, producing, and comprising, in combination:
    (A) a potential source;
    (B) a cycle timing circuit connected to said potential source, comprising
        (a) a capacitance charged from said potential source,
        (b) a variable resistance connected in the charging path for said capacitance to determine the charging rate thereof
            (1) said variable resistance being adjustably preset to establish a desired condition level, and
        (c) a detector operating in response to the development of a predetermined potential across said capacitance to signal the expiration of a cycle time, and
        (d) switching means controlled by said detector and operating to initiate each cycle; and,
    (C) an on interval timing circuit connectable to said potential source through said switching means at the beginning of each operating cycle, said on timing circuit comprising
        (a) a capacitance charged from said potential source,
        (b) a condition responsive resistance connected in the charging path for said capacitance to determine the charging rate thereof,
            (1) said resistance having a resistance value proportional to the existing level of said condition, and (c) a detector operating when the potential developed across said capacitances reaches a reference voltage to signal the expiration of said on timing interval and (d) output means responsive to said detector for disenabling said condition producing means at the expiration of said on time interval in each cycle
 (1) whereby to automatically establish and maintain the level of said condition at the desired level determined by the adjustably preset resistance of said variable resistance.

6. An input controller for timing the on interval included in successive operating cycles for condition producing means, and comprising, in combination:

(A) a source of electrical potential;
(B) a first section operating to time the period of each operating cycle of condition producing means, said first section comprising
 (a) a capacitance charged from said potential source,
 (b) a variable resistance connected in the charging path for said capacitance, said variable resistance
  (1) being adjustably preset according to a desired condition level,
 (c) a variable conductance device connected in the charging path for said capacitance, said device
  (1) compensating for the effects on said condition resulting from variations in a second condition by regulating the charging current for said capacitance
 (d) means establishing a fixed reference potential,
 (e) a detector operating to signal the expiration of a cycle period when said capacitance has charged to a potential substantially equal to said reference potential,
 (f) a trigger circuit operating in response to said detector means, and
 (g) a relay conditioned by said trigger circuit, said relay having
  (1) relay contacts; and,
(C) a second timing section operating to time the on interval of each operating cycle upon connection to said potential source through said relay contacts of said first timing section, said second section comprising
 (a) an output relay having
  (1) self-holding relay contacts maintaining said second timing section connected to said potential source during said on interval, and
  (2) second relay contacts enabling the energization of the condition producing means during said on interval,
 (b) a capacitor charged from said potential source,
 (c) a condition responsive resistive element connected in the charging path for said capacitance,
  (1) the resistance of said resistive element being proportional to the existing level of said condition,
 (d) a potential divider connected across said potential source,
 (e) detector means operating to signal the expiration of said on interval when said capacitance has charged to a potential equal to a reference potential established by said potential divider, and
 (f) a latch operating in response to said detector means for de-energizing said output relay,
  (1) whereby to establish and maintain the level of said condition at said desired level determined solely by said variable resistance.

7. An input controller for timing the on and off intervals of successive operating cycles for a heater disposed within an enclosure, and comprising, in combination:

(A) a potential source;
(B) a cycle timing section operating to time the period of each operating cycle of said heater, and comprising
 (a) a capacitor charged from said source,
 (b) a variable resistor connected in the charging path for said capacitor, said variable resistor
  (1) being adjustably preset according to a desired temperature level within said enclosure,
 (c) a transistor having
  (1) an emitter-collector circuit connected in the charging path for said capacitor, and
  (2) a base;
 (d) a first thermocouple responsive to the temperature within said enclosure for developing a voltage proportional thereto,
 (e) a second thermocouple responsive to the temperature surrounding said enclosure and developing a voltage proportional thereto,
  (1) said first and second thermocouples connected to the base of said transistor for controlling the conductance of its emitter-collector circuit according to the temperature differential between the inside and the outside of said enclosure,
 (f) a Zener diode connected to said source for establishing a fixed reference potential,
 (g) a detector developing an output signaling the expiration of a cycle period when said capacitor has charged to a potential substantially equal to said fixed reference potential,
 (h) a monostable trigger circuit operating in response to the output from said detector for developing an output pulse of a duration substantially less than the duration of said cycle period.
 (i) a relay normally energized from said source, said relay having
  (1) first relay contacts connected across said capacitor, and
  (2) second relay contacts, and
 (j) an output circuit responsive to said trigger circuit for momentarily de-energizing said output relay for the duration of said pulse output,
  (1) whereby to discharge said capacitor through said first relay contacts, and
  (2) upon re-energization of said output relay to begin the next operating cycle,
(C) an on interval timing section connected to said source through said second relay contacts upon de-energization of said relay in said cycle timing section, said on interval timing section including
 (a) an output relay having
  (1) self-holding relay contacts maintaining said output relay energized during said on interval, and
  (2) second relay contacts enabling energization of said heater during said on interval, and
  (3) third relay contacts,
 (b) a capacitor charged from said source,
 (c) a thermistor connected in the charging path of said capacitor,
  (1) the resistance of said thermistor being inversely proportional to the temperature within said enclosure,
 (d) a potential divider connected across said source, (e) a detector operating to signal the expiration of said on interval when said capacitor has charged to a potential substantially equal to a reference potential established by said potential divider, (f) a bistable latch triggered from a first state to a second state by said detector means, (1) said bistable latch operating in its second state to de-energize said output relay, (2) the first contacts of said output relay opening to disconnect said on interval timing circuit from said source causing said latch to revert to its first stable state, (3) the second relay contacts opening to disable said heater, and (4) said third relay contacts closing to discharge said capacitor, (g) whereby to establish and maintain the temperature within said enclosure at the desired temperature level determined solely by said variable resistor in said cycle timing section.

8. A method of controlling the supply of a quantity to a system having a variable dissipation rate for said quantity, including the steps of:

sensing the existing level of said quantity in said system and automatically maintaining a first time interval proportional to the second existing level of said quantity in said system; and sensing the dissipation rate of said quantity from said system and automatically maintaining a second time interval proportional to the sensed dissipation rate of said quantity from said system; and supplying said quantity to the system in on-off cyclical fashion, each cycle including a period corresponding to said first time interval during which said apparatus is activated, and each cycle being of a duration corresponding to said second time interval.

9. The method according to claim 8 for controlling temperature of a system wherein said first time interval is proportional to the existing temperature of the system and wherein said second time interval is proportional to the rate of heat loss from the system.

10. The method according to claim 8 for controlling temperature of a system wherein said first time interval is proportional to the existing temperature of the system and wherein said second time interval is proportional to the difference between temperatures inside and outside the system.

References Cited

UNITED STATES PATENTS

| | | | |
|---|---|---|---|
| 2,838,644 | 6/1958 | Rolfson et al. | 219—499 X |
| 3,102,689 | 9/1963 | Ditto | 219—499 X |
| 3,240,428 | 3/1956 | Umrath | 219—492 X |
| 3,355,632 | 11/1967 | Wallentowitz | 317—148.5 X |
| 3,036,188 | 4/1962 | Ditto | 219—492 |
| 3,284,721 | 11/1966 | Carlson | 219—501 X |
| 3,315,891 | 4/1967 | Allen | 219—492 |

GEORGE HARRIS, Primary Examiner

F. E. BELL, Assistant Examiner

U.S. Cl. X.R.

219—492, 501; 317—48.5